Sept. 25, 1956     H. A. SMITH, JR     2,763,928
TIMER CONTROLS FOR AUTOMATIC GLASS CUTTING MACHINE
Filed March 8, 1952     4 Sheets-Sheet 4
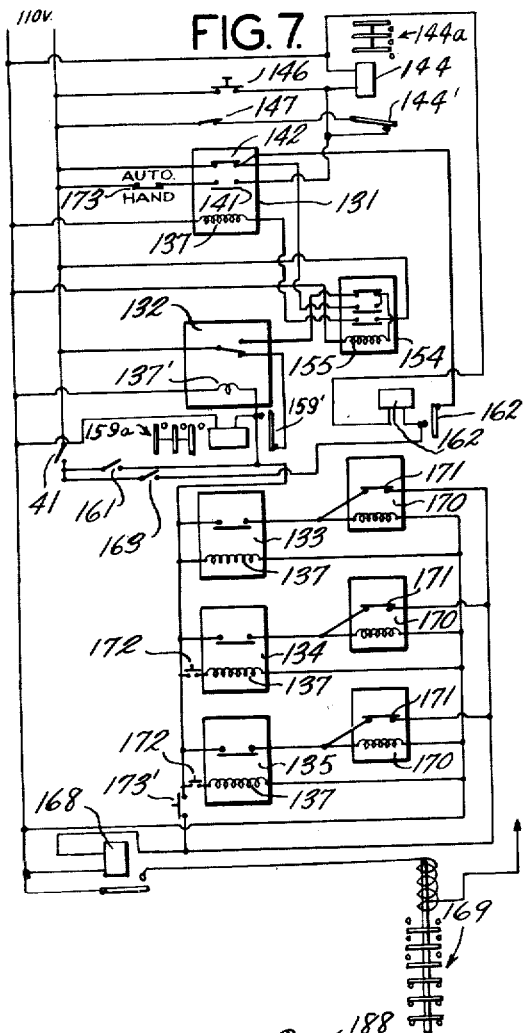
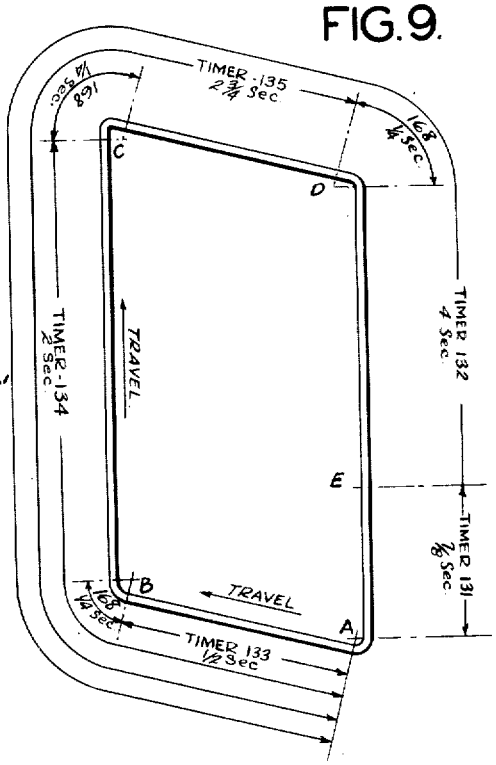
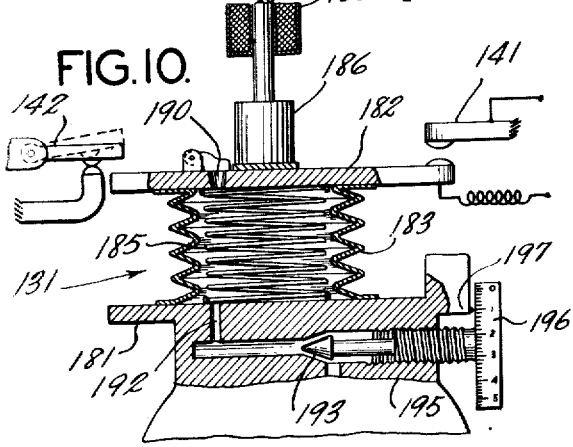
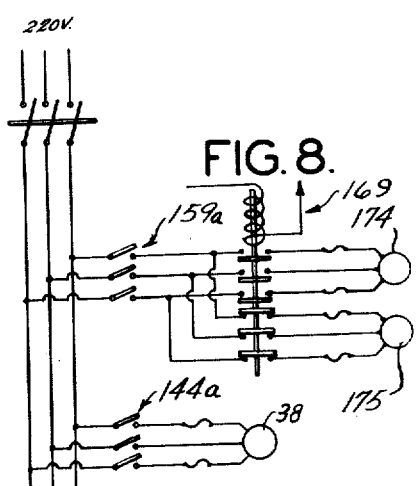
INVENTOR.
Harry A. Smith, Jr.
BY Oscar L. Spencer
ATTORNEY

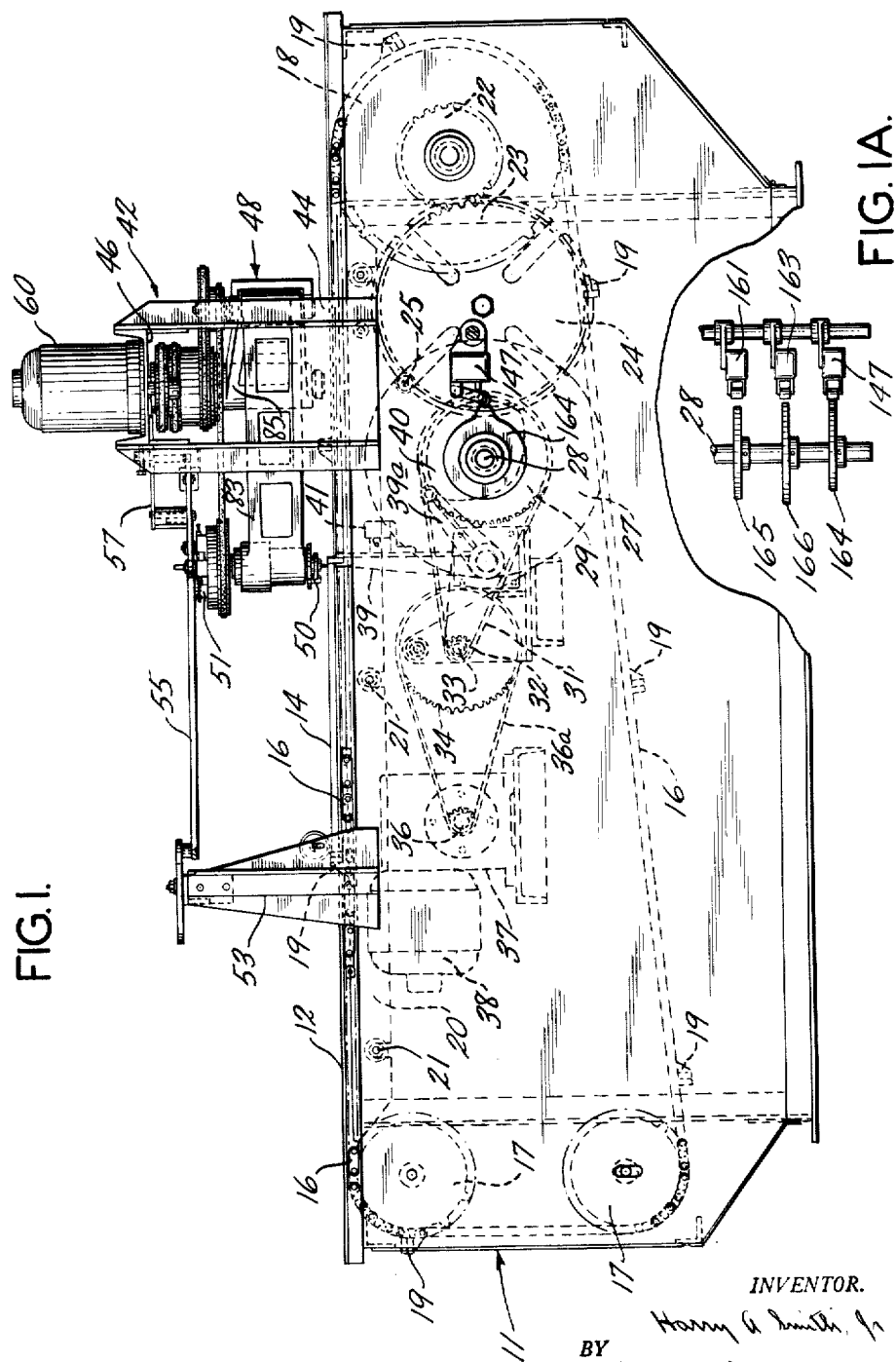

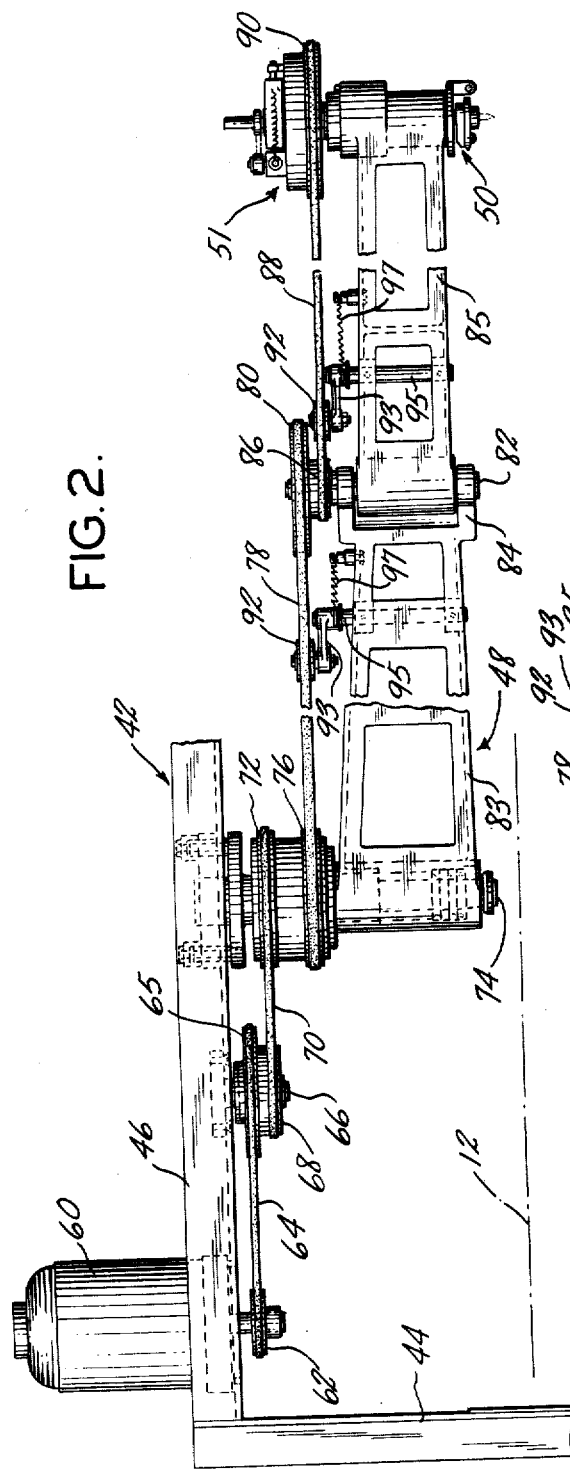

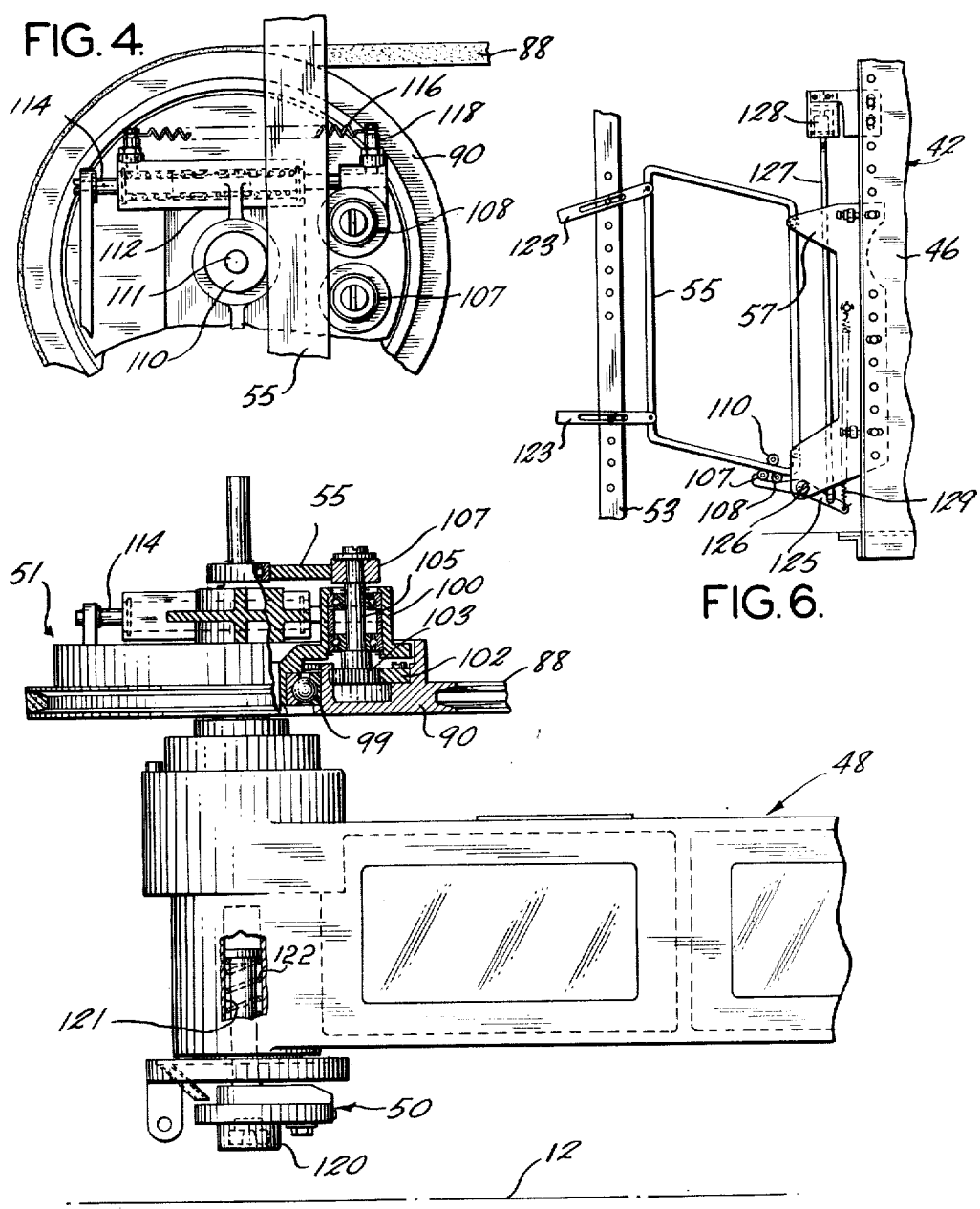

United States Patent Office 2,763,928
Patented Sept. 25, 1956

2,763,928
TIMER CONTROLS FOR AUTOMATIC GLASS CUTTING MACHINE

Harry A. Smith, Jr., Tarentum, Pa., assignor to Pittsburgh Plate Glass Company, Pittsburgh, Pa., a corporation Application March 8, 1952, Serial No. 275,498

18 Claims. (Cl. 33—27)

This invention relates to the control of translation speed of cutting machines that have a template follower for propelling a cutting head along a predetermined path across a work piece.

With glass cutting machines, it has been found satisfactory to move a scoring tool along a straight line on the glass at a faster rate than when moving around sharp curves. Such machines have been equipped with limit switches placed at selected locations along the template for effecting a change in speed as the template follower approached each right angle or other sharp curve of the template. The removal and relocating of these limit switches with each change of template has been a time-consuming job and one requiring considerable skill.

It is an object of this invention to provide improved speed control apparatus for cutting machines, and more particularly to provide timers which have no connection with the template shape and template follower speed to operate the template follower speed control as the follower approaches each of the sharp curves of the template.

Other features of the invention relate to the starting of timers simultaneously with the starting of the template follower; to a construction in which a single time restores the speed control to its original condition after each operation by a plurality of other timers; and to the ultimate control of the starting by the arrival of a work piece in position to be cut, when used on automatic machines.

The invention is intended for use with glass cutting machines and will be described in a glass cutting machine; but some features of the invention are of wider application and not limited to machines for cutting glass.

Other objects, features and advantages of the invention will appear or be pointed out as the description proceeds.

In the drawing forming a part hereof in which like reference characters indicate corresponding parts in all the views, Figure 1 is a side elevation of a glass cutting machine embodying this invention, Figure 1a is a diagrammatic plan view of the cams that operate limit switches of the machine shown in Figure 1.

Figure 2 is an enlarged view showing a portion of the frame and the jointed supporting arm of the machine illustrated in Figure 1, Figure 3 is a top plan view, on a reduced scale, of the jointed supporting arm shown in Figure 2, Figure 4 is a greatly enlarged top plan view of the template follower operating along a template, Figure 5 is a side elevation, partly broken away and in section, of the template follower shown in Figure 4, the air motor for moving the cutting tool into and out of contact with the work piece, and a portion of the supporting arm by which the template follower and cutting head are carried, Figure 6 is a top plan view, on a reduced scale, of the template, the template support, and a portion of the frame of the machine shown in Figure 1, Figure 7 is a simplified wiring diagram of the control mechanism of the machine shown in the other views, Figure 8 is another portion of the wiring diagram of the machine, Figure 9 is a timing diagram showing the sequence of operation of the timers and the template follower as the latter travels around a template, and Figure 10 is a diagrammatic sectional view of one of the timers.

Conveyor

The cutting machine shown in Figure 1 includes a main frame 11 with a support or table 12 on its upper side. Work pieces, which comprise flat plates of glass 14 in the illustrated machine, slide along the table 12. The glass plate 14 is propelled along the table 12 by a conveyor comprising an endless chain 16 that passes around sprockets 17 and 18 on shafts that are supported from the main frame 11.

A dog 19, attached to the endless chain 16, extends upward above the level of the table 12 and serves to push the glass plate 14 along the table. There are other dogs 19 attached to the chain 16 at spaced regions along its length for moving successive plates of glass along the table 12. There is a support 20 under the chain 16 for keeping the top run of the chain level and substantially even with the top of the table 12. This support 20 is attached to the main frame 11 and by fastenings 21.

The conveyor chain sprocket 18 is connected with a gear 22 driven by a larger gear 23 which is connected with a wheel 24 of a Geneva movement. A quarter turn of the Geneva wheel 24 turns the sprocket 18 half a revolution which is sufficient to move the glass plate 14 out of the cutting field and to bring another glass plate into the cutting field. A pin 25, which operates the Geneva wheel 24, extends from a wheel 27 secured to a shaft 28.

A sprocket 29 is secured to the shaft 28 and is driven by a chain 31 from a smaller sprocket 32 on a shaft 33. This shaft 33 is driven by a sprocket 34, from a small sprocket 36 through a chain 36a. The sprocket 36 is at the low speed end of a gear reduction unit 37 which is driven by an electric motor 38.

An arm 39 has an upper end which extends above the table 12 to provide an abutment in the path of the glass plate 14 when the arm 39 is in its raised position. This arm 39 rocks about a shaft secured to the main frame 11 and the rocking movement is controlled by a cam 40 on the shaft 28. A crank arm 39a, connected with the arm 39, carries a cam follower which runs on the cam 40. A limit switch 41 is located in the path of the arm 39 and is actuated when the arm 39 rocks clockwise in Figure 1. When the conveyor brings a glass plate 14 into contact with the upper end of the arm 39, the arm yields enough to close the switch 41. The operation of this limit switch 41 in the control circuit of the machine will be explained in connection with Figure 7.

Supporting structure and template follower drive

An upper frame 42 is secured to the main frame 11 and extends above the table 12. This upper frame 42 has vertical supports 44 located on opposite sides of the machine so that the glass plate 14 can pass between them as it travels along the table 12. The upper frame 42 has a horizontal beam 46 which spans the entire width of the table 12; and this beam serves as a support for a jointed arm 48 that supports a cutter head 50 and a template follower 51.

There is a template supporting frame 53 comprising vertical elements at opposite sides of the frame 11 and a horizontal support extending across the table 12 for the full width of the machine. A template 55 is supported at its forward end from the template supporting frame 53, and at its rearward end by a bracket 57 attached to the upper frame 42.

The jointed arm 48 supports the cutter 50 and template follower 51 for universal movement in a plane over the area occupied by the glass plate 14. Rollers on the template follower 51 extend upwardly and into contact with the sides of the template 55 which is located above the template follower 51. Power to operate the template follower is supplied by a motor 60 mounted on the beam 46 of the upper frame 42. This motor transmits power to the template follower 51 through a system of belts which is clearly illustrated in Figure 2.

The motor 60 has an armature shaft which extends through the beam 46 and there is a pulley 62 (Figure 2) at the lower end of the armature shaft. This pulley 62 is connected by a belt 64 with another pulley 65 supported on a stud shaft 66 extending downwardly from the beam 46. The pulley 65 drives a smaller pulley 68 which is connected by another belt 70 to a pulley 72 on a post 74 that supports the jointed arm 48 from the beam 46. The jointed arm swings on the post 74 about an axis normal to the plane of the table on which the glass plate rests.

There is another pulley 76 on the post 74 and this pulley 76 is driven by the pulley 72 and transmits motion through a belt 78 to a large pulley 80 on a pivot shaft 82 at the joint of the arm 48. The rearward link 83 of the jointed arm 48 has a forked end 84 that carries the pivot shaft 82, and the forward link 85 of the jointed arm extends between the branches of the fork 84 and swings on the pivot shaft 82. A smaller pulley 86, connected to the pulley 80, drives a belt 88 which passes around a pulley 90 of the template follower 51.

The tension of the belts 78 and 88 is maintained by idler rollers 92 supported by bell cranks 93. These bell cranks are pivotally mounted intermediate their ends, on stud shafts 95 carried by brackets extending upwardly from the respective links of the jointed arm 48. A spring 97 urges each of the bell cranks 93 to swing in a direction to hold its roller 92 against the belt which it is used to tension. The amount of tension of the belts is determined by the strength of the springs 97.

*Template follower and cutting head*

Figs. 4 and 5 show the construction of the template follower 51. The pulley 90 rotates on ball bearings 99 on a main body 100 of the template follower. Within the pulley 90 there is an internal gear 102 which meshes with a spur gear 103 secured to the lower end of a roller drive shaft 105. This roller drive shaft 105 turns in ball bearings in the main body 100, and the upper end of the roller drive shaft 105 has a template drive roller 107 secured to it.

The template follower has a similar drive roller 108 close to the drive roller 107 and on the same side of the template 55. Both of these drive rollers rotate in the same direction and advance the template follower along the template 55 by their friction with the side face of the template.

In order to maintain substantial pressure between the template and the drive rollers 107 and 108, there is an idler roller 110 in contact with the opposite side of the template 55. This idler roller 110 is carried by a shaft 111 on a bracket 112 which has a sleeve portion slidable along a fixed supporting bar 114. A tension spring 116 stretched between a fixed post 118 on the main body of the template follower and a similar post on the sleeve 112 urges the idler roller 110 against one side of the template and the rollers 107 and 108 against the other side of the template.

There is another sleeve portion of the bracket 112 slidable along another fixed supporting bar 114 on the other side of the roller 110. This structure is broken away in Figure 4 since it is the same as that shown, but the entire assembly is shown on a small scale in Fig. 3. The strength of the springs 116 determines the pressure of the rollers 107 and 108 against the template and the corresponding friction available for driving the template follower along the template 55.

The cutter head 50 has a holder 120 for a tool which is used to cut the glass. In the construction illustrated, this tool holder is not in alignment with the template 55, but the template is designed to make allowance for the offset of the cutting tool from the point of tangency of the roller 110 with the template 55.

The tool holder 120 is normally in a raised position so that cut plates can be removed by the conveyor and new plates brought into position under the template. This bias of the tool holder toward the raised position can be obtained by means of a spring or in any other conventional way. Within the cutting head there is an air cylinder 121 which pushes the tool holder 120 downward to bring its tool into contact with the glass plate at the beginning of each cutting operation and to maintain a pressure of the tool against the glass during the cutting operation. A spring 122 (Fig. 5) under a piston in the air cylinder 121 can be used to give the tool holder 120 its bias toward raised position. The supply of air to, and the exhaust from, the cylinder 121 are controlled by an electrically-operated valve, as will be explained more fully in connection with Figure 7.

*Template and brake*

Figure 6 shows the template 55 supported from the frame 53 by brackets 123 which have slotted connections for adjustably securing them to the frame 53. On the other side, the template 55 hangs from the bracket 57. The template follower is illustrated diagrammatically in Figure 6 by the rollers 107, 108 and 110.

The template follower is held in a starting position by a brake lever 125 with a hooked end that holds the rollers 107 and 108. This lever 125 rocks about a pivot 126 extending downwardly from the bracket 57.

The brake lever 125 is moved into operative position, to hold the rollers 107 and 108 against movement along the template, by a connecting rod 127 which is thrust toward the lever 125 by a cylinder and piston servomotor 128. As long as working fluid is supplied to the servomotor 128, the brake 125 is applied to the template follower. Whenever the pressure in the servomotor 128 is released, the brake lever 125 is rocked counterclockwise, in Figure 6, by a spring 129 to release the brake.

*Control circuit*

Figure 7 shows a portion of the wiring diagram for the machine. There are five timers 131—135, illustrated diagrammatically. Each of the timers 131, 133—135, has a bellows and a solenoid for starting the operation of the timer. The principle of operation of the timer 131 will be described in connection with the diagrammatic illustration of Figure 10. The timers 133—135 are similar to the timer 131 except that they control only one circuit; and the timer 132 is a synchronous motor type which can be set for somewhat longer periods than the others. It is sufficient for the present to understand that each of the timers 131, 133, 134, and 135 has an actuating coil 137, and timer 132 a motor coil 137'; and that the time delay begins when the coils 137 and 137' are energized and these coils must remain energized during the time-delaying operations of the timers.

The timer 131 has a normally open switch 141 and another switch 142 which is normally closed. This means that when the timer 131 is actuated by its electric coil, it will, after a predetermined time delay, close the normally open switch 141 and open the normally closed switch 142.

A relay 144 controls a switch 144' and also controls the circuit that supplies power for the operation of the conveyor motor of the machine. When power is supplied to this relay 144, it closes the switch 144' and also closes the contacts 144a of the circuit that supplies power to the motor 38 which drives the conveyor to move a glass plate from under the cutter and to bring another glass plate into position to be operated on by the cutter. Power can be supplied to the conveyor motor relay 144 through a manually operated, normally open, starter switch 146, or through a normally closed, cam operated switch 147 if the relay switch 144' is closed, or through the normally open switch 141 of the timer 131.

Power is supplied to the coil 137 of the timer 131 by a relay 154. This relay includes an actuating coil 155 and three switches. One of the switches is closed and the other two are open, as shown, when the actuating coil 155 is de-energized.

The lower switch of the relay 154 is connected in series with the actuating coil 137 of the timer 131 for supplying power to that timer whenever the relay 154 is energized. The upper switch of the relay 154 is in series with the actuating coil 155 and with the timer 132 to provide a circuit through which the relay 154 is energized from the timer 132. The middle switch of the relay 154 is in series with the coil 155 and with the switch 142 of the timer 131 so that after the relay 154 is initially energized by the timer 132, it remains energized until the end of the period of the timer 131.

The supply of power to the template follower motor is controlled by a template follower control relay 159. This relay 159, when energized, also closes a switch 159' in the control circuit. Power is supplied to this relay 159 by a cam-operated switch 161 in series with the switch 41. Since the switch 41 is closed by the glass plate, no power is supplied to the relay 159 unless there is a glass plate in position under the cutter.

The raising and lowering of the cutter with respect to the glass workpieces is under the control of an air valve operated by a control switch which is energized by a control relay 162. This relay 162 receives power through another cam-operated switch 163, in series with the switch 41. The operation of the control relay 162 also closes a switch 162' in the control circuit.

The switches 147, 161 and 163 are operated by cams in timed relation with the operation of the conveyor and while the conveyor-drive mechanism is running. Figure 1a shows the location of the switches 147, 161 and 163 in position to be operated by the cams 164, 165 and 166 respectively on the shaft 28 of the conveyor drive mechanism.

The cam 166 operates the switch 163 to close the circuit to the air pressure control relay 162 a short while before the cam 165 operates the switch 161 for the template follower motor control relay 159. The cam 164 then opens the switch 147 to stop the conveyor motor, but before the cam 164 has moved far enough to open this switch 147, both of the cams 165 and 166 have turned beyond their switch-operating positions and let both of the switches 161 and 163 return to their normal open positions.

This opening of the switches 161 and 163 has no immediate effect upon the control relays 159 and 162, however, because the closing of the switch 159' by the relay 159 establishes a holding circuit through the timer 132; and the closing of the switch 162' by the relay 162 establishes a holding circuit for that relay through the timer 131.

The speed of the template follower motor is controlled by a timer relay 168 which supplies power to an operating coil of a speed control switch 169 that connects either high speed or low speed coils of the template follower motor into the circuit.

This timer relay 168 is actuated successively by the timers 133, 134 and 135; but after each actuation, the timer relay 168 remains in the slow speed position for a set period of time and then returns automatically to its high speed position.

The timer relay 168 is adjusted, with respect to the speed of the template follower so that it will remain in its slow speed position long enough for the template follower to travel around a sharp curve of the template. The timer relay 168 is a pneumatic bellows type with an actuating coil and with the same kind of chamber with a bleed port, and means for adjusting the effective cross section of the bleed port, as will be described in connection with Fig. 10; but with the parts oriented so that it has a time delay that occurs after the actuating coil is de-energized in contrast to the timers 131—135 in which the time delay occurs after and while their actuating coils are energized.

Each of the timers 133—135 has a relay 170 with an actuating coil and a normally closed switch 171 and an actuating coil that opens the switch 171 when the relay coil is energized. When the period of each of the timers 133—135 runs out, the timer closes its switch and supplies power to energize the coil of its associated relay 170. A momentary supply of power is also sent to the speed control timer relay 168 through the switch 171 before the actuating coil has time to open the switch. The required time lag is obtained by weights added to the timer core.

The number of timers 133, 134 and 135 which are used on the machine depends upon the number of sharp curves that will be encountered by the template follower as it travels around a template. In order to make some of the timers ineffective when the template has fewer sharp curves than there are timers, some of the timers, for example the timers 134 and 135, are equipped with cut-out switches 172 which can be opened when these timers are not going to be used. A master switch 173 can be used to change the control circuit from automatic to hand operation. Another master switch 173' is normally open, and when it is closed it maintains the slow speed coils of the template follower motor in the circuit all the time.

Figure 8 shows a portion of the wiring diagram with the power connections to the motors for the conveyor and template follower. The contacts shown are designated by the reference characters of the relays of which these contactors form a part. The slow speed windings of the template follower motor are indicated by the reference character 174 and the high speed windings of the motor by the reference character 175. The contacts of the speed control switch 169 are shown in Fig. 8. When the switch is in raised position, it closes the circuit to the slow speed windings 174 and opens the circuit to the high speed windings 175. When the switch is in the lowered position, as shown in Fig. 8, the circuit of the slow speed windings is open, and the circuit of the high speed windings is closed. All of the contacts of the speed control switch 169 are in series with the switch contacts 159a of the template follower control relay 159 so that the template follower motor cannot operate on either high speed or low speed unless the template follower control relay 159 is energized to close its switch contacts 159a.

Figure 8 shows also the conveyor motor 38; and shows this motor connected with the power line through the contacts 144a of the conveyor motor control relay. The way in which this control relay is connected in the rest of the circuit in the machine has already been illustrated in Figure 7 and described in connection with that figure.

*Timing of speed changes*

Figure 9 shows a timing diagram for the cutting machine. When the cycle of operation starts, the template follower is at the point A, being held in that position by the brake described in connection with Figure 6. When the cycle of operation begins, all of the timers are operated simultaneously, but they are adjusted so as to have different periods, that is, they "time out" in succession as the cycle continues.

With the particular template 55, illustrated in Figure 9, the timers are set as illustrated. For other patterns the timer setting and the time cycle will vary. In Figure 9, the timers are set so that the timer 133 has a period of one-half (½) second, this being the period required for the template follower to travel from the point A to a point B just ahead of the first sharp curve of the template. At the end of one-half (½) second, the timer 133 operates the timer relay 168 and causes the slow speed windings of the template follower motor to be brought into the circuit for one-quarter second. During this time, the template follower travels at slow speed around the first sharp curve just beyond the point B. At the end of one-quarter (¼) second, the timer relay 168 automatically cuts out the slow speed windings of the motor and puts the high speed windings back into the power circuit.

The template follower travels at its high speed along the template until an interval of two seconds after the beginning of the cycle. At this instant, the timer 134 completes its period and operates its relay 172 to send a momentary pulse of power to the timer relay 168 to again put the slow speed windings back in the template follower motor circuit for another quarter second during which time the template follower travels around the sharp curve of the template just beyond the point C in Fig. 9.

After traveling around this sharp curve, the template follower again travels at high speed until it reaches the point D. The timer 135 is set to time out at the instant that the template follower reaches the point D or two and three-quarter (2¾) seconds after the start of the cycle in the timing diagram shown in Figure 9. This timer 135 operates its relay 173 to send a pulse of power to again operate the timer relay 168 to slow down the template follower motor while the template follower travels around the sharp curve just beyond the point D. After the lapse of a one-fourth (¼) second, the timer relay 168 again increases the motor speed and the template follower travels along the last section of the template until it reaches a location near the point E, at which time the timer 132 completes its period, and the template follower coasts to a stop around the curve at A where the rollers encounter the brake lever.

*Principle of timer operation*

Figure 10 shows a diagrammatic view of the timer 131. This timer includes a rigid base 181 and a movable plate 182 connected to the rigid base by a bellows 183. The bellows is urged into expanded condition by a coil spring 185 compressed between the plates 181 and 182. A weight 186 rests on top of the plate 182 and is heavy enough to collapse the bellows against the pressure of the spring 185. The weight 186 is lifted by a solenoid 188 to start the operation of the timer, the solenoid comprising a motor means to move the timer.

When the solenoid 188 is de-energized, and the weight 186 drops on the plate 182, it pushes the plate down and forces the air out of the bellows past a check valve 190. This check valve swings in a direction to permit rapid discharge of air from the bellows but closes to prevent return of air to the bellows.

In order for the bellows to expand, in response to pressure by the spring 185 after the weight 186 has been lifted, air must flow into the bellows through a bleed port 192 commanded by a needle valve 193. The length of time required for the bellows to expand, that is, the period of the timer, depends upon the adjustment of the needle valve 193.

The needle valve 193 is carried by the inner end of a threaded stem 195 which has a graduated disk 196 at its outer end. There is a pointer 197 at a fixed location on the body of the timer, and the setting of the period of the timer can be adjusted to any desired value by turning the disk 196 until the selected graduation comes into position opposite the pointer 197.

When the bellows 183 is collapsed, and the movable plate 182 is in its lowered position, the switch 142 is closed and the switch 141 is open. As the plate 182 rises to the top of its stroke, at the end of the period of the timer, it actuates both switches to open the switch 142 and to close the switch 141.

All of the timers can be made with electro-pneumatic operating mechanism similar to that disclosed in Fig. 10, or other forms of timers, including electronic devices, can be employed.

*Review of operation*

Reviewing the operation briefly, and referring first to Figure 7, the machine is started initially by closing the normally open switch 146. This supplies power to the relay 144 which closes the circuit of the conveyor motor. As soon as the relay 144 is closed, the switch 144' is also closed to establish a circuit parallel to that of the manual starter switch 146 so that the relay 144 remains energized and it is unnecessary for the operator to hold the starter switch 146 closed.

The conveyor motor operates the machine and brings a glass plate along the table into position under the template. When the glass plate strikes the abutment at the upper end of the arm 39 (Figure 1), the switch 41 is closed to indicate that a glass plate is in position. Immediately thereafter the cam 166 (Figure 1A) closes the switch 163 and supplies power to energize the control relay 162 (Figure 7) which supplies power to open the air valve that brings the cutting tool down into contact with the glass plate.

Immediately following the actuation of the switch 163 by the cam 166, the switch 161 is actuated by the cam 165 to supply power to the template follower control relay 159. The energizing of this relay 159 causes power to be supplied to the template follower motor which begins operation at its high speed. The cam 164 then opens the normally closed switch 147 to stop the conveyor motor.

The closing of the switch 161 also energizes the actuating coils 137 of the timers 133—135 and supplies power also to the coil 137' of the timer 132. Thus the timers 132—135 are all energized simultaneously with the starting of the template follower motor.

When the period of the timer 133 has run out, this timer closes its switch and supplies power to its associated relay 170. This energizing of the relay 170 opens the switch 171, but before opening the switch, supplies a momentary pulse of power to actuate the speed control timer relay 168. The time lag is obtained by weights added to the timer core.

This supply of power to the speed control timer relay 168 closes a switch in the circuit with the speed control switch 169 to bring the slow speed coils of the template follower motor into the motor circuit. The timer relay 168 maintains its switch closed for only a brief period and then opens the switch again to de-energize the speed control switch 169 and return the high speed coils to the circuit of the template follower motor.

When the period of the timer 134 runs out, this timer closes its switch and energizes its associated relay 170 to cause another operation of the speed control timer relay 168 and the speed control switch 169 in a manner similar to that already described in connection with the timer 133. In like manner, the completion of the period of the timer 135 causes it to energize its associated relay 170 and cause a third operation of the speed control timer relay 168 and speed control switch 169. If there are not enough sharp curves in the template to make the three timers 133, 134 and 135 necessary, the timer 134 or 135, or both, are rendered inoperative by opening one or both of the switches 172.

When the period of timer 132 has run out, this timer shifts its switch to open the circuit of the template follower control relay 159 and to close the circuit to the actuating coil 155 of the relay 154. The actuation of the relay 154 energizes the timer 131. This timer 131, after a brief time delay for which it is set, opens the circuit of the relay 154 and energizes the conveyor motor control relay 144. The template follower motor coasts to complete its travel around the template during the time delay for which the timer 131 is set, and the template follower is brought to a stop, at the original position from which it started, by the template follower brake previously described in connection with Figure 6.

The operation of the timer 131 at the expiration of its period, also opens the circuit of the control relay 162 so that the supply of air is cut off from the cutting head. The operation of the air valve releases air from the cutting head hold-down cylinder 121 (Figure 5) and supplies air to the servomotor 128 (Figure 6) that operates the brake lever 125.

The conveyor motor operates the conveyor to carry the cut plate of glass along the table of the machine and away from the area under the template while another part of the conveyor brings a new glass plate under the template. This new glass plate closes the switch 41 and the cams 166 and 165 operate the limit switches 163 and 161 to start a new cycle of operation.

The preferred embodiment of the invention has been illustrated and described, but changes and modifications can be made without departing from the invention as defined in the claims.

What is claimed is:

1. A cutting machine including a cutting head, a holder for a template, a power-driven template follower connected with the cutting head and movable along the template, a speed controller movable into different positions in one of which it increases the speed of the template follower and in the other of which it decreases the speed of the template follower, means for actuating the speed controller at different times during the movement of the cutting head by the template follower progressively along a single cut, said means including a plurality of separately operable automatic timers, and mechanism that starts the operation of said timers simultaneously, said timers including mechanism with different time cycles in the respective timers so that the timers actuate the speed controller successively.

2. The cutting machine described in claim 1, with independent means for adjusting the respective timers to change their periods with respect to one another and to change the time between the successive operations of the speed controller by the timers to accommodate different templates.

3. In a cutting machine having a cutting head and a template follower connected to the cutting head and movable along a template, a speed controller for the template follower including speed changing apparatus with a timer that returns the template follower to its original speed after a predetermined period, a plurality of automatic timers, each of which initiates an operation of the speed controller, and mechanism that starts all of said plurality of automatic timers simultaneously at the beginning of the operation of the template follower.

4. In a cutting machine having a cutting head, a holder for a template, a template follower, power means that move the template follower along the template, the template follower being connected with the cutting head, a speed reducer that changes the speed of the template follower, a plurality of automatic timers that operate the speed reducer at different times as it moves the cutting head along a single cut, each of said automatic timers including operating means that move independently of the power means for the template follower and against the pressure in an air chamber, and each of said timers having an air chamber with a bleed port, and means for adjusting the opening of the bleed port to change the period of each of the timers.

5. A cutting machine comprising a cutting head for operation on a workpiece, a template follower connected with the cutting head, a support by which the cutting head and template follower are supported for universal movement in a plane, a speed controller for the template follower including a device that reduces the follower speed, and a timer that restores the speed after a predetermined period, a plurality of automatic timers that successively operate the speed reducing device, each of the automatic timers including a pneumatic bellows, and adjustable means for regulating the flow of air between the interior of the bellows and the outside atmosphere to change the period of the timer.

6. A glass-cutting machine having a frame on which a glass workpiece is supported, a cutting head located over the workpiece, a jointed frame that supports the cutting head for universal movement in a plane, mechanism that moves the cutting head toward and from the workpiece, a template, a template follower connected with the cutting head, a motor that drives the template follower, high and low speed windings in the motor, a speed controller operable into different positions selectively to connect either the high or low-speed winding of the motor across a circuit, a plurality of automatic timers that time out successively to connect the low speed winding of the motor in the power circuit to begin predetermined periods of reduced speed operation of the template follower, mechanism that starts all of the timers simultaneously, a single timer device that restores the high speed winding to the circuit at the end of each of said predetermined periods, each of the timers including a pneumatic element adjustable to change the period of the timer.

7. A cutting machine including a cutting head for universal movement in a plane, a template having sharp curves, a power-driven template follower connected with the cutting head and movable along the template, a speed controller movable into different positions alternately to decrease and increase the speed of the template follower, means for actuating the speed controller at different times to shift it alternately between its different positions including a plurality of automatic timers, actuating means that starts all of the timers simultaneously, and mechanism in each of the respective timers that operates that timer at a different instant from each of the other timers and when the template follower is at a different distance along the template.

8. The cutting machine described in claim 7 with a single timer device that restores the speed controller to an original condition after a predetermined period following each operation of the speed controller out of said original condition by any one of said plurality of automatic timers.

9. A cutting machine including a cutting head supported for universal movement in a plane, a template follower operably connected with the cutting head, a template having sharp curves at regions along its length, a speed controller for the template follower movable between two positions, in one of which the template follower operates at high speed and in the other of which the template follower operates at reduced speed, a plurality of pneumatic timers including chambers with bleed ports through which air moves to control the period of the timers, adjustable devices for changing the cross section of the bleed ports to change the periods of the timers, connections through which each of the pneumatic timers moves the speed controller into position to reduce the template follower speed, the respective pneumatic timers being adjusted to make their operation correspond to the approach of the template follower to one of the sharp curves of the template, and another timer that shifts the speed controller back into its high-speed position at a predetermined time after each operation of the speed controller by any one of the pneumatic timers.

10. A glass-cutting machine including a table that supports a glass workpiece, a cutting head, and a tool holder carried by the cutting head and located over the workpiece, mechanism that moves the tool holder into and out of contact with the workpiece, a template for determining the shape to be cut, a template follower connected with the cutting head and movable along the template, a motor that drives the template follower along the template, a speed controller for the motor, a control movable into different positions to operate the mechanism that moves the tool holder into and out of contact with the glass workpiece on the table, a circuit that supplies power to the template follower motor, said circuit including a switch that remains open until said control is in position to bring the cutting head into contact with the workpiece, automatic timer means for operating the speed controller during the movement of the template follower along the template, and common actuating mechanism that starts the automatic timer means and supplies power to the template follower motor simultaneously.

11. The cutting machine described in claim 10, characterized by a conveyor that brings successive glass workpieces to the table, an abutment on the table for positioning each successive workpiece, a limit switch operated by pressure of the workpiece against the abutment, the mechanism that moves the tool holder into and out of contact with the workpiece being controlled by said limit switch.

12. In a cutting machine, a power driven template follower, a speed controller for the template follower movable between two positions, in one of which the template follower operates at high speed and in the other of which the template follower operates at reduced speed, a plurality of timers, each of which operates to shift the speed controller toward one position, other timer means that operates to shift the speed controller toward the other position, mechanism that starts the operation of all of the plurality of timers simultaneously when the template follower is started, and mechanism that starts the operation of the other timer means each time that one of said plurality of timers shifts the speed controller.

13. A cutting machine including a template follower having a motor with high and low speed windings, a speed controller comprising a switch movable into different positions to selectively connect the high speed and low speed windings in the power circuit, a plurality of pneumatic timers that shift the speed control switch in one direction as each of said timers completes its period of operation, a single timer that restores the speed control switch to its original position after a predetermined time lapse from its operation by said pneumatic timers, and adjustable means to change the periods of the pneumatic timers, the single timer also comprising a pneumatic timer and having a chamber with a bleed port and means for adjusting the effective cross section of the bleed port.

14. In a cutting machine having a power driven template follower and a speed controller movable between different positions, in one of which it reduces the speed of the template follower for sharp curves along the length of a template, a plurality of timers that shift the speed controller into position to change the template follower speeds at different times corresponding to the approach of the template follower to successive sharp curves along the length of the template, means for adjusting the timers to change their periods in accordance with different distances between curves of different templates, and other means connected with each timer and movable into positions to make the respective timers ineffective to shift the speed controller so that the number of operating timers can be co-ordinated with the number of sharp curves of the template.

15. The cutting machine described in claim 14, characterized by common control mechanism that supplies a starting current to all of the timers simultaneously, and in which the control means for rendering the timers ineffective comprise switches operable to cut any selected timers out of the starter circuit.

16. A cutting machine comprising a cutting head, a holder for a template, a template follower connected with the cutting head, motor means that move the template follower along the template, a speed reducer for said motor means, a timer, other motor means that operate at a different speed from the first motor means for moving the timer, operative connections between the timer and the speed reducer for operating the speed reducer in response to movement of the timer, automatic apparatus that starts the timer each time the cutting machine is started, and an adjusting device in the timer movable into different positions to change the length of the period of operation of the timer before the timer moves the operative connections to the speed reducer to change speed of the template follower motor means.

17. In a cutting machine having a cutting head and a holder for a template, a template follower connected with the cutting head, motor means that move the template follower along the template, a speed reducer for the motor means, a timer, other motor means that operate at a different speed from the first motor means for moving the timer, operative connections between the timer and the speed reducer for operating the speed reducer in response to movement of the timer, and common actuating means that start simultaneously the motor means for the template follower and the motor means for the timer.

18. The cutting machine described in claim 17, and in which the timer is an electro-pneumatic timer including an electro-magnetic device that controls the starting of the timer, a pneumatic chamber with a movable wall, a spring which moves the wall and which constitutes the motor means of the timer, the operative connection between the timer and the speed reducer including electrical contacts operated by the movement of the wall, the chamber having a bleed port through which air moves into and out of said chamber, a needle valve commanding the bleed port, and a device to adjust the needle valve to change the period of the timer.

References Cited in the file of this patent

UNITED STATES PATENTS

| | | |
|---|---|---|
| 1,474,991 | Yerger | Nov. 20, 1923 |
| 2,118,170 | Crowley et al. | May 24, 1938 |
| 2,211,985 | Peters | Aug. 20, 1940 |
| 2,364,644 | Mott et al. | Dec. 12, 1944 |
| 2,573,653 | Schrock | Oct. 30, 1951 |
| 2,576,291 | Fletcher | Nov. 27, 1951 |
| 2,612,689 | Kirkman et al. | Oct. 7, 1952 |
| 2,618,857 | Goralske | Nov. 25, 1952 |

Dedication 2,763,928.—*Harry A. Smith, Jr.*, Tarentum, Pa. TIMER CONTROLS FOR AUTOMATIC GLASS CUTTING MACHINE. Patent dated Sept. 25, 1956. Dedication filed July 25, 1973, by the assignee, *PPG Industries, Inc.*

Hereby dedicates the remainder of its term to the free use and benefit of the People of the United States.

[*Official Gazette December 4, 1973.*]